No. 709,898. Patented Sept. 30, 1902.
C. P. GOERZ.
BINOCULAR PRISM TELESCOPE.
(Application filed May 1, 1901.)
(No Model.)
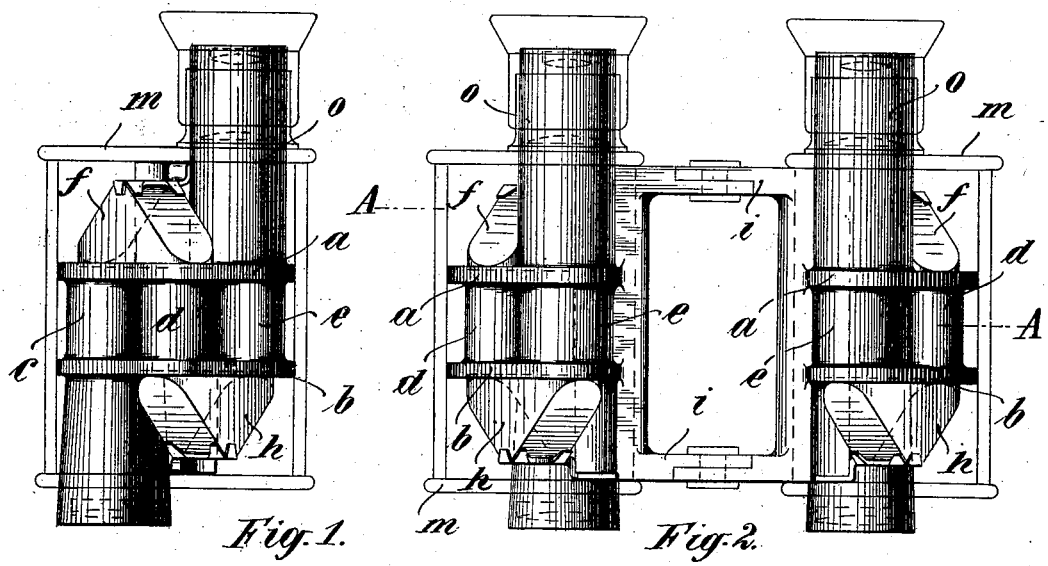
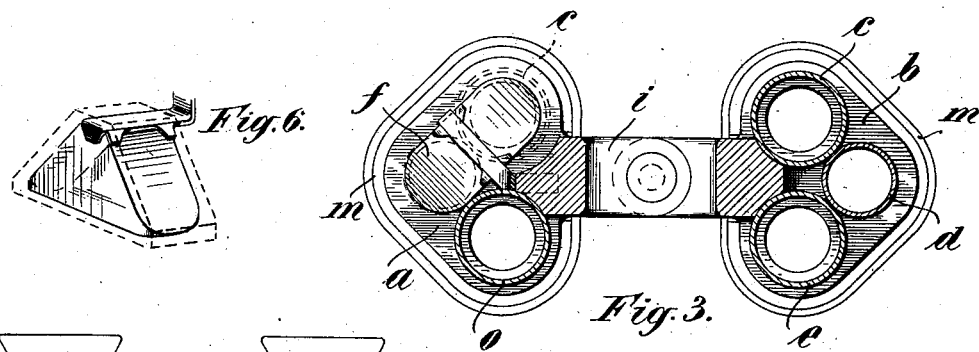
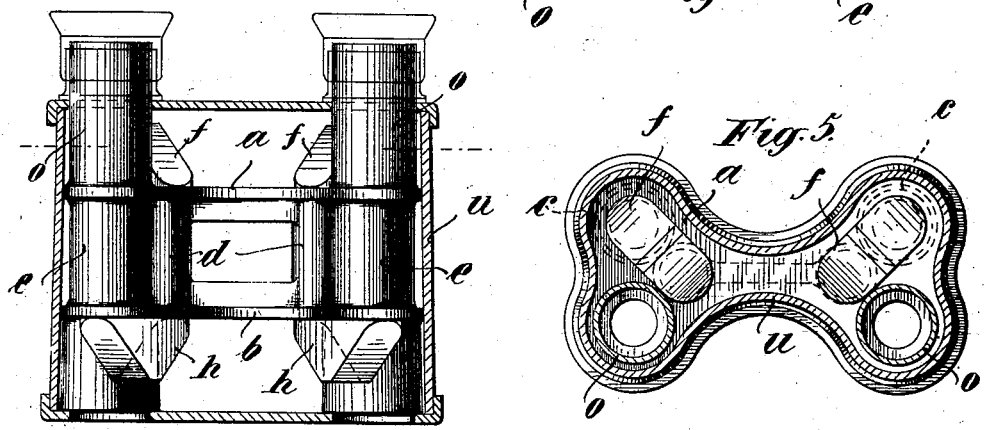
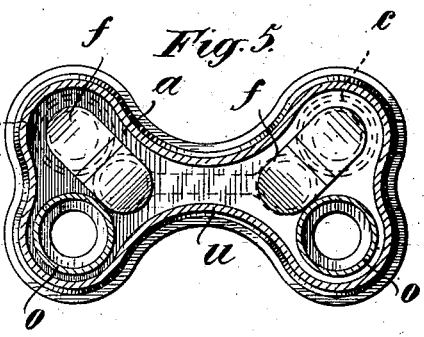
Witnesses:
H Joseph Doyle
A B Brown
Inventor:
Carl Paul Goerz
by Marion & Marion
Attorneys.

UNITED STATES PATENT OFFICE.

CARL PAUL GOERZ, OF FRIEDENAU, NEAR BERLIN, GERMANY.

BINOCULAR PRISM-TELESCOPE.

SPECIFICATION forming part of Letters Patent No. 709,898, dated September 30, 1902.

Application filed May 1, 1901. Serial No. 58,319. (No model.)

*To all whom it may concern:*

Be it known that I, CARL PAUL GOERZ, a citizen of the Kingdom of Prussia, and a resident of Friedenau, near Berlin, Germany, (whose post-office address is Rheinstrasse 45 and 46,) have invented certain new and useful Improvements in or Relating to Binocular Prism-Telescopes, of which the following is a specification.

The present invention relates to a binocular prism-telescope the interior of which is easily accessible—for example, for the purpose of cleaning—without disturbing in the least the relative positions of the elements forming in their totality the optical system principally without disturbing the parallelism of the optical axes. For that purpose the optical systems are constructed in such a way as to be completely independent from the shell or mantle inclosing and protecting them against external influences, whereas both optical systems are rigidly connected to each other in such a way that the parallelism of the optical axes may not be interfered with by removing them from the case.

In the annexed drawings the invention is clearly shown. Figure 1 represents a binocular prism-telescope of this peculiar form in side elevation. Fig. 2 is a front elevation of the same. Fig. 3 is a horizontal section through same on line A A of Fig. 2. Figs. 4 and 5 show a modified form of the same telescope, elevation and plan. Fig. 6 shows in perspective view the fastening of the prisms by means of flat springs having a peculiarly-shaped end.

Two plates or bridges $a$ and $b$, provided with suitable perforations, are held in their relative positions by suitable distance-pieces $c$, $d$, and $e$, which in the form represented in the annexed drawings consist in short pieces of tubes. Plate $a$ carries the ocular tube $o$ and a prism $f$. To the lower plate $b$ is fastened the objective tube and the second prism $h$ in such a manner that the pencil of light coming from the objective enters the prism $f$, where it is twice reflected, and passes to the second prism $h$, from where it passes to the ocular lens after being again reflected twice.

Owing to the fact that the supports for the plates $a$ and $b$ are in the form of tubes $c$, $d$, and $e$, arranged specifically as shown, a passage-way or conduit is formed for the pencils of light, which passage-way is closed substantially from the lens in the object-tube to that in the ocular tube, and especially is this true when the cap shown in Fig. 6 is used. In the other forms shown the casing protects the prisms. There is a distinct advantage in this in that there is no possibility of a fusing of the pencils of light when passing in opposite directions or otherwise from one prism to another, the tubes forming independent conduits leading from one point to the other, including the points between the object-tube and the first prism and the second prism and the ocular tube. It will be readily understood, therefore, that the object and ocular tubes are simply secured to the respective plates and can be, if desired, removed therefrom for cleaning purposes without disturbing any of the prism connections, &c.

Two symmetrically-arranged systems of the kind hereinbefore described are united to each other by means of a connection or bridge $i$, which may be either rigid or provided with a joint or similar means for adjusting the instrument to the different widths between the visual axes of both eyes.

From the description above it will be readily seen that the telescope is complete without the necessity of an inclosing case; but in this form it is necessary to cover the prisms by means of caps of suitable form, as indicated in dotted lines in Fig. 6, in order to prevent lateral rays from entering.

If it is desired to inclose the entire system, with the exception of the protruding ends of the object and ocular tubes, a tubular casing of corresponding cross-section is slipped over the described systems, which are secured therein by any suitable means.

In the form shown in Figs. 1 and 2 each optical system has a separate covering or casing $m$, while in the modification represented by Figs. 4 and 5 the two optical systems forming the instrument are inclosed in one common casing $u$.

What I claim is—

1. A binocular prism-telescope comprising a plurality of telescopes, prisms, a bridge uniting the telescopes, said bridge being provided with means for altering the distance of the axis of the telescopes and constructed to itself serve as a support for the optical systems, substantially as described.

2. A binocular prism-telescope, comprising two sets of perforated plates, each set comprising a pair of plates with spacing-tubes therebetween, an ocular tube and prism carried by one, an objective and a second prism carried by the other plate, a bridge uniting the two single telescopes and serving directly as carriers and supports for the single optical systems, substantially as described.

3. A binocular prism-telescope comprising two sets of perforated plates, each set comprising a pair of plates with spacing-tubes therebetween, an ocular tube and prism carried by one, an objective and a second prism carried by the other plate, a bridge uniting the two single telescopes and serving directly as carriers and supports for the single optical systems, and means for adjusting the distance of the axis of the telescopes.

4. A binocular prism-telescope comprising two sets of perforated plates, each set comprising a pair of plates with spacing-tubes therebetween, an ocular tube and a prism carried by one plate, an objective and a second prism carried by the other plate, two adjustable bridges uniting the two single telescopes together and formed at their ends directly as supports and carriers for the single optical systems, and means carried by said bridges for altering the distance of the axis of the telescopes, substantially as shown and described.

5. A binocular prism-telescope comprising two sets of perforated plates, each set comprising a pair of plates with spacing-tubes therebetween, an ocular tube and a prism carried by one plate, an objective and a second prism carried by the other plate, two adjustable bridges uniting the two single telescopes together and formed at their ends directly as supports and carriers for the single optical systems, means carried by said bridges for altering the distance of the axis of the telescopes, and a separate covering for each of said systems.

In testimony whereof I affix my signature in presence of two witnesses.

CARL PAUL GOERZ.

Witnesses:
  HENRY HASPER,
  WOLDEMAR HAUPT.